UNITED STATES PATENT OFFICE.

JOHN PURING, OF NEW YORK, N. Y., ASSIGNOR TO ROBESON PROCESS COMPANY, OF NEW YORK, N. Y., A CORPORATION OF NEW JERSEY.

LEATHER-DYES.

1,185,605.   Specification of Letters Patent.   Patented May 30, 1916.

No Drawing.   Application filed December 13, 1915. Serial No. 66,576.

*To all whom it may concern:*

Be it known that I, JOHN PURING, a citizen of Russia, residing at New York, in the county of New York and State of New York, have invented certain new and useful Improvements in Leather Dyes, of which the following is a specification.

This invention relates to leather dyes; and it comprises as a new composition a leather dye comprising acetate of iron ("pyrolignite of iron") and pyrogallic acid, a waste sulfite liquor preparation and a suitable oil, all as more fully hereinafter set forth and as claimed.

Pyrolignite of iron is a crude acetate of iron made with the aid of pyroligneous acid; and it is extensively used by leather dyers in various combinations. As I have found, in admixture with pyrogallic acid it gives a bluish black solution without forming a precipitate. In combination with this material I usually employ a material for bodying the leather and making it water and sunproof.

As the bodying material, I employ a sulfite waste liquor preparation and a suitable oil. Sulfite waste liquor as it leaves the paper digester is a thin, somewhat acid, unstable liquid which however by proper methods of operation (see Patent 833634) can be converted by evaporation into thick permanent liquids or even dried solids, of value in the arts for various purposes. It is evaporated material of this character which I advantageously use.

In an advantageous specific embodiment of my invention I may take waste sulfite liquor of, say, about 30° Baumé and thin it down to, say, about 15.5° B. with boiled linseed oil. The oil and liquor are emulsified by strong agitation. To this prepared sulfite liquor I next add pyrolignite of iron and pyrogallic acid. To 20 to 30 parts by weight of prepared sulfite liquor, made as above described, may be added a mixture of 20 parts of ordinary commercial solution of iron acetate ("liquid pyrolignite of iron") and 10 parts of a solution of one part of pyrogallic acid dissolved in 10 parts of water. Upon adding the black pyrolignite mixture, its color at first disappears or diminishes; but soon returns. And the final color attained, I find, is much more intense than initial color of the mixture of pyrolignite and pyrogallic acid. After the mixture has attained its deep color, it may be further diluted with two or three times its bulk of water and is then ready for use.

In lieu of using the black coloring developed by pyrolignite and pyrogallic acid, I may use other stains or dyes, such as anilin colors, alizarin, etc.; but I find that for leather dyeing the pyrolignite mixture gives the best results.

In use, the leather is best dipped in the described mixture at a temperature around 20° to 30° C. The time of dipping varies according to the thickness and texture of the leather, the temperature, the strength of solution, etc., but is usually from 5 to 15 minutes. After dipping the leather may be washed or passed through rollers to remove surplus solution. It may then be pressed or stretched for drying. I find it advantageous to work the leather before it is quite dry; pressing it out in all directions to prevent its drawing up and prevent stretching after drying.

Other oils such as nut oils, soy bean oil, China wood oil, cotton seed oil, etc., may be used in lieu of or in addition to the linseed oil.

What I claim is:

1. A leather dye comprising pyrolignite of iron and pyrogallic acid and a body giving material.

2. A leather dye comprising pyrolignite of iron, pyrogallic acid and a sulfite waste liquor preparation.

3. A leather dye comprising pyrolignite of iron, pyrogallic acid and a composition of concentrated waste sulfite liquor and an oil.

4. A leather dye comprising pyrolignite of iron, pyrogallic acid and a composition of concentrated waste sulfite liquor and linseed oil.

In testimony whereof, I affix my signature.

JOHN PURING.